(12) United States Patent
Weber

(10) Patent No.: US 8,414,044 B2
(45) Date of Patent: Apr. 9, 2013

(54) PRODUCT GRIPPER

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 308 days.

(21) Appl. No.: 12/660,775

(22) Filed: Mar. 3, 2010

(65) Prior Publication Data

US 2010/0225132 A1   Sep. 9, 2010

(30) Foreign Application Priority Data

Mar. 9, 2009   (DE) .......................... 10 2009 012 332

(51) Int. Cl.
  *B25J 15/00* (2006.01)
  *B66C 1/42* (2006.01)
(52) U.S. Cl.
  USPC .................. 294/119.1; 294/67.33; 294/81.54; 294/207
(58) Field of Classification Search .................. 294/207, 294/119.1, 103.1, 67.33, 81.54, 86.4, 2; 901/37, 901/39; 414/618, 735, 814
See application file for complete search history.

(56) References Cited

U.S. PATENT DOCUMENTS

| 4,479,673 A * | 10/1984 | Inaba et al. .................... 294/207 |
| 4,599,037 A * | 7/1986 | Ross et al. .................. 414/752.1 |
| 4,696,503 A * | 9/1987 | Collodel ........................ 294/207 |
| 5,282,659 A * | 2/1994 | Yasuraoka et al. ................. 294/2 |
| 8,267,452 B2 * | 9/2012 | Weber ............................ 294/207 |
| 2004/0051328 A1* | 3/2004 | Cinotti et al. ............... 294/119.1 |
| 2009/0317221 A1* | 12/2009 | Hawes ........................... 414/618 |

FOREIGN PATENT DOCUMENTS

| DE | 689 05 768 T2 | 11/1989 |
| DE | 196 44 158 A1 | 4/1998 |
| DE | 60 2004 008 323 T2 | 10/2004 |
| EP | 0 508 256 A2 | 10/1992 |
| EP | 1 921 030 A2 | 5/2008 |
| EP | 2 168 892 A1 | 3/2010 |
| GB | 2 448 947 A | 11/2008 |
| WO | WO 2009/029696 A1 | 3/2009 |

* cited by examiner

*Primary Examiner* — Paul T Chin
(74) *Attorney, Agent, or Firm* — Kilpatrick Townsend & Stockton LLP

(57) ABSTRACT

A product gripper for the taking up of a product, has two vane blades; has a driving means to move the vane blades between a first position, in which the vane blades can be placed onto a support for the product to be taken up at oppositely disposed sides of the product to be taken up, and a second position, in which the vane blades are located at least partly beneath the product to be taken up; and has a downholder for the fixing of the product to be taken up while the vane blades are moved beneath it, with the downholder being arranged above a vane blade plane defined by the vane blades.

Figure 1:
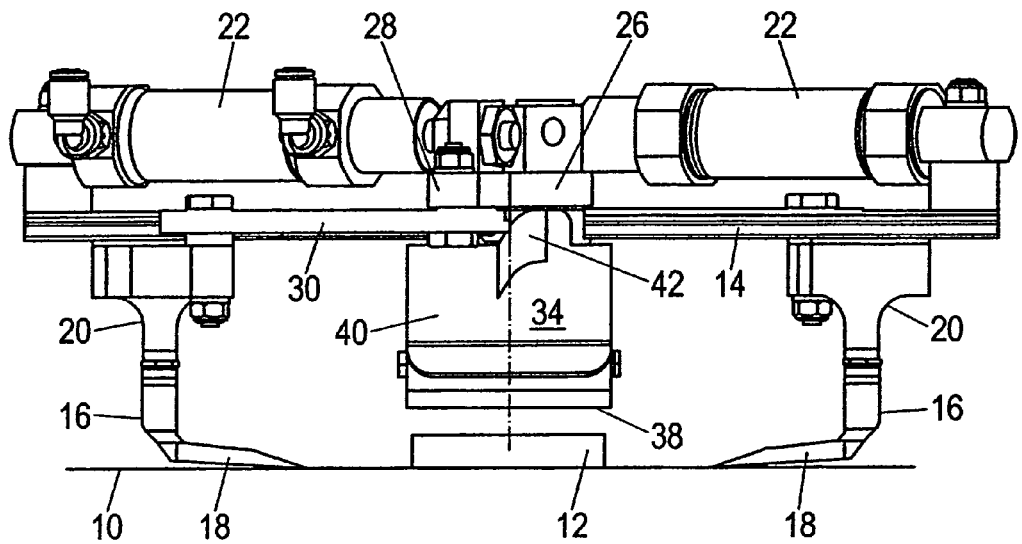

20 Claims, 6 Drawing Sheets

PRODUCT GRIPPER

This application claims priority to German Application No. 10 2009 012 332.6, filed Mar. 9, 2009, the disclosure of which is incorporated herein by reference.

The invention relates to a product gripper for the taking up of a product, having two vane blades, having a driving means to move the vane blades between a first position, in which the vane blades can be placed onto a support for the product to be taken up at oppositely disposed sides of the product to be taken up, and a second position, in which the vane blades are located at least partly beneath the product to be taken up, and having a downholder for the fixing of the product to be taken up while the vane blades are moved beneath it, with the downholder being arranged above a vane blade plane defined by the vane blades.

Product grippers of this type are used, for example, in the food industry to transfer food products from a first conveying means to a second conveying means, to sort them or to introduce them into a packaging. The product grippers are typically mounted at the moving part of a robot.

In a known product gripper of the initially named kind, the vane blades are rigidly attached to a frame structure of the product gripper and the downholder includes an elastically deformable component whose lower side facing the product to be taken up has a spacing from the vane blade plane in the unloaded state of the product gripper, said spacing being lower than the height of the product to be taken up so that on the lowering of the product gripper onto the product to be taken up the elastically deformable component first engages at the product upper side and subsequently the vane blades touch down on the product support. This has the disadvantage that the downholder is supported at the product while the product gripper as a whole is lowered further to bring the vane blades into contact with the product support.

It is the underlying object of the invention to provide a product gripper which enables a more gentle product handling.

A product gripper having the features of claim 1 is provided to satisfy the object.

The product grip in accordance with the invention is in particular characterized by a ramp mechanism by which the movement of the vane blades relative to one another is coupled to a movement of the downholder relative to the vane blade plane.

In other words, the invention is based on the general idea of decoupling the bringing into engagement of the downholder and the product to be taken up from the lowering movement of the product gripper and instead to link it with the movement of the vane blades. The downholder is in other words not brought into engagement with the product to be taken up in that the product gripper is lowered onto the product support, but rather by the moving together of the vane blades from their first position into their second position.

The decoupling of the pressing of the downholder toward the product to be taken up from the lowering movement of the product gripper and the fact associated with this that the spacing between the lower side of the downholder and the vane blade plane is always larger than or at least equal to the height of a product to be taken up makes possible a more gentle handling of the product since the product gripper is not supported at the product on its lowering onto the product support.

Advantageous embodiments of the invention can be seen from the dependent claims, from the description and from the drawing.

To ensure that a product to be taken up is effectively fixed and is not displaced by the moving vane blades, the ramp mechanism is preferably designed so that the downholder comes into engagement with the product to be taken up before the vane blades move beneath it.

The ramp mechanism is preferably formed so that it converts a rotation or a translation into a translation in each case. In other words, the lowering movement of the downholder can be achieved while interposing the ramp mechanism either by a rotary movement or by a linear movement.

In accordance with a first embodiment, the ramp mechanism includes two parts rotating relative to one another about an axis of rotation. The axis of rotation is preferably oriented perpendicular to the vane blade plane.

A first part of the ramp mechanism can include a ramp ring of the downholder which is in particular arranged concentrically to the axis of rotation. It is generally possible that the ramp ring only has one ramp. A more even force distribution is, however, achieved, if the ramp ring has two ramps which are arranged on oppositely disposed sides of the axis of rotation.

A second part of the ramp mechanism can be connected to a lever arm which is pivotable, in particular about the axis of rotation. The lever arm can be a component of a drive mechanism which serves to move the vane blades out of their first position into their second position and vice versa. The second part of the ramp mechanism preferably includes at least one cam which faces toward the vane blade plane and which is in engagement with the first part of the ramp mechanism. On a pivoting of the lever arm, the cam can, for example, run onto a ramp of the ramp ring and can thereby urge the downholder in the direction of the vane blade plane. It also applies here that a single cam is generally sufficient to bring the downholder into engagement with a product to be taken up. Advantageously, however, two cams are provided which are arranged on oppositely disposed sides of the axis of rotation and which cooperate with two corresponding ramps of the ramp ring.

To facilitate a running of the or each cam onto the ramp(s) of the ramp ring, the or each cam preferably has a sloped surface at a side running onto a first part of the ramp mechanism.

In accordance with a second embodiment, the ramp mechanism includes two parts which are displaced linear to one another and are at least partly in engagement with one another via sloped surfaces. In this case, the ramp mechanism therefore does not convert a rotary movement, but rather a first linear movement into a second linear movement.

A first part of the ramp mechanism can include at least one sloped surface formed at the downholder. In contrast, a second part of the ramp mechanism can be fixedly connected to one of the vane blades. A respective second part of the ramp mechanism is preferably fixedly connected to each vane blade to achieve a more even force distribution.

The or each second part of the ramp mechanism can, for example, be formed by a ramp element, e.g. a rod, which extends substantially parallel or obliquely to the vane blade plane and which has a sloped surface at its end remote from the associated vane blade.

The dimensioning of the sloped surface of the ramp element viewed parallel to the vane blade plane is advantageously shorter than the distance between the first and second positions of the vane blades. In this manner, the downholder is pressed down onto a product to be taken up before the vane blades come into engagement therewith and the or each ramp element slides so far over the downholder on the moving together of the vane blades that the sloped surfaces of the downholder and of the or each ramp element come out of engagement and the downholder is blocked in its pressed down position. The downholder can consequently not be unintentionally released from a taken up product.

To prevent a rotation of the downholder and in particular to ensure a reliable function of the ramp mechanism in the first embodiment, the downholder is advantageously rotationally fixedly attached to a frame structure of the product gripper.

Furthermore, the downholder is preferably movable against the restoring force of a spring element toward the vane blade plane. On the moving together of the vane blades and on the bringing into engagement of the downholder with a product to be taken up resulting from this, the spring element is therefore tensioned, whereas it can relax again on the moving apart of the vane blades to bring the downholder and the taken up product out of engagement. The spring element can be a tension spring, for example.

The use of such a spring element is in particular of advantage when the parts of the ramp mechanism cooperate within one another only at one side, as in the case of sloped surfaces running onto one another. It is, however, also generally conceivable to couple the parts of the ramp mechanism to one another via cam guides, whereby both the movement of the downholder toward the vane blade plane and the movement of the downholder away from the down blade plane can be achieved without a spring element.

Figure 2:
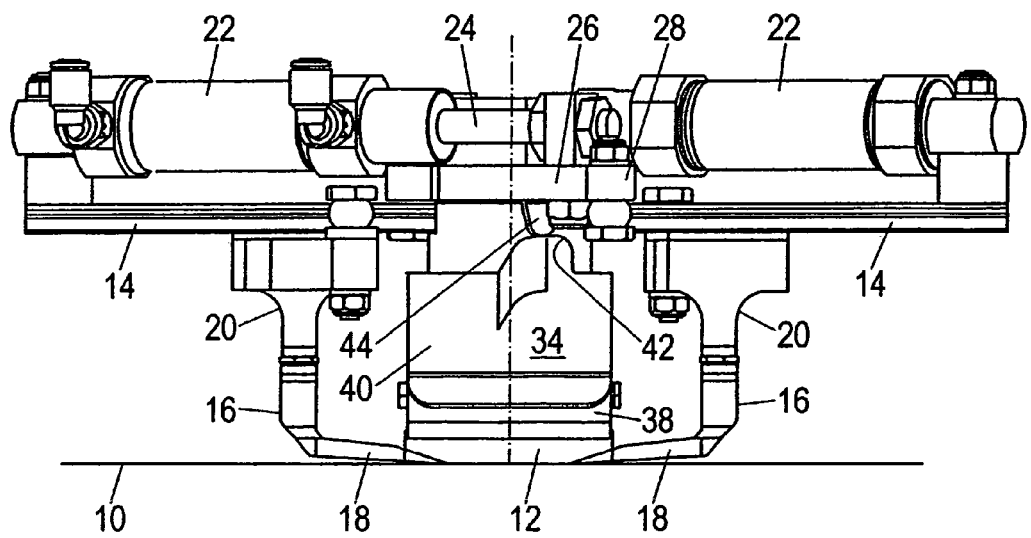
Figure 3:
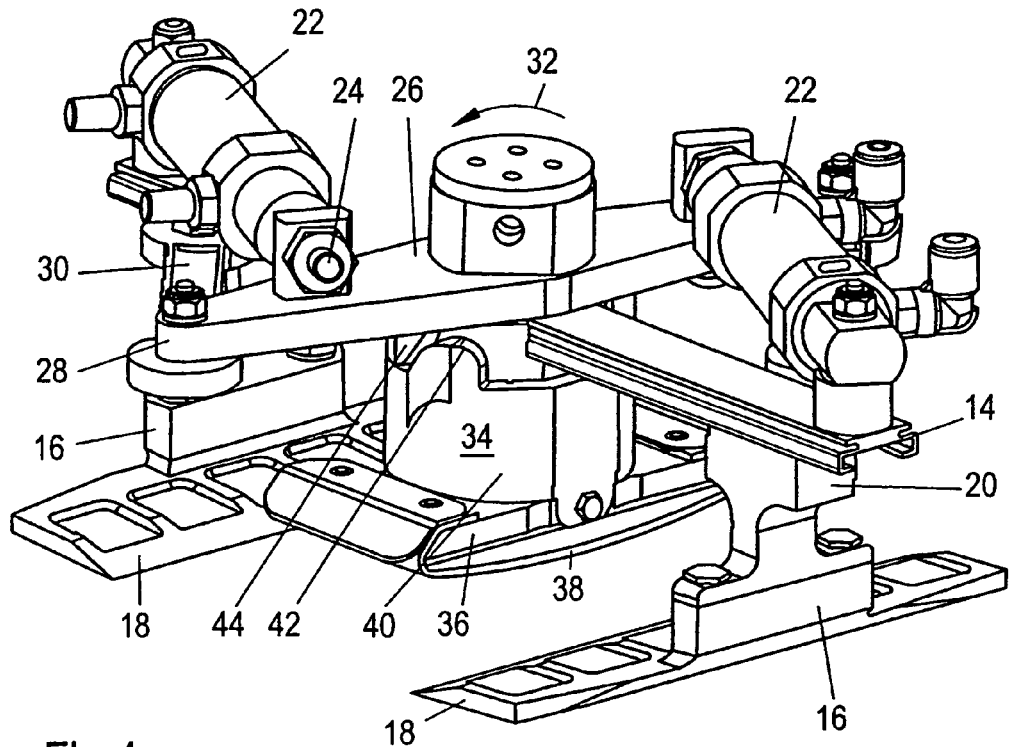
Figure 4:
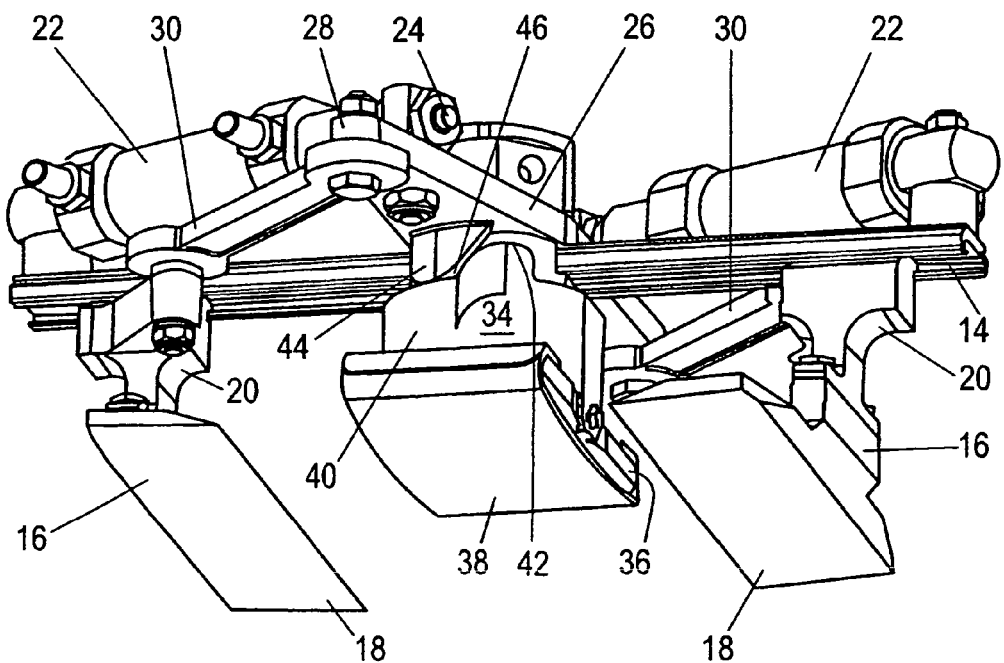
Figure 5:
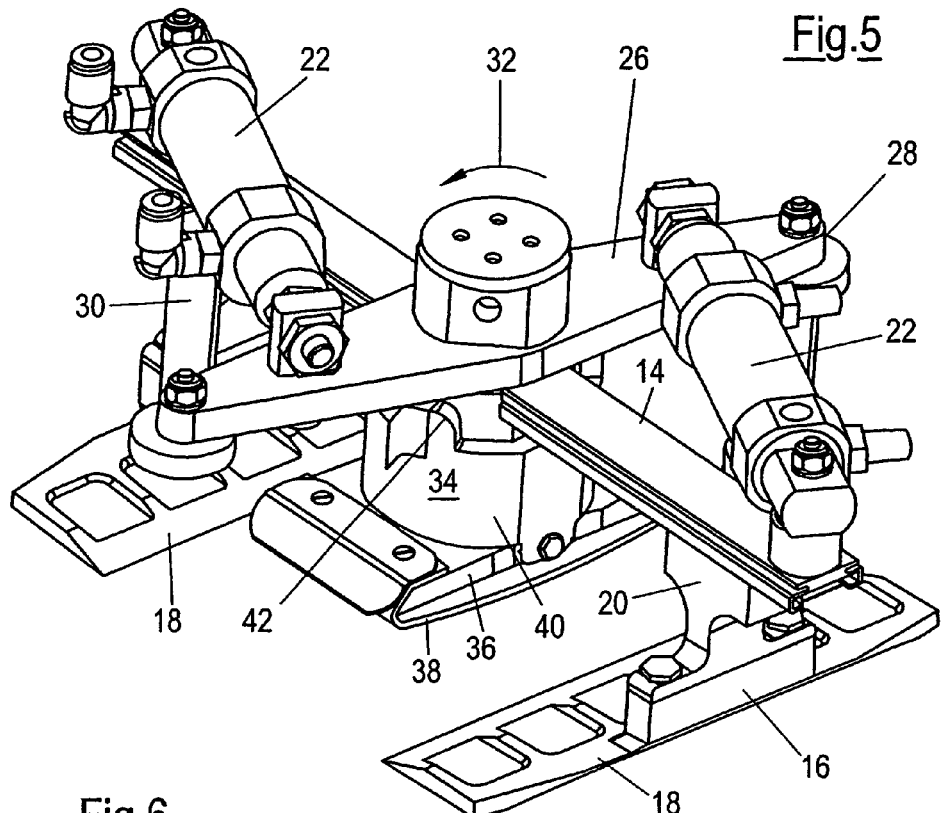
Figure 6:
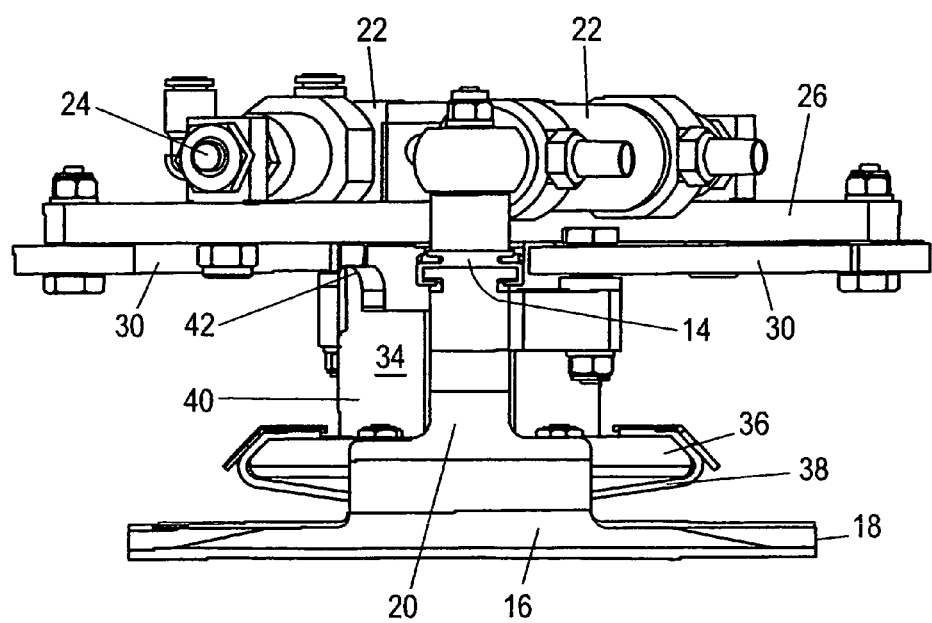
Figure 7:
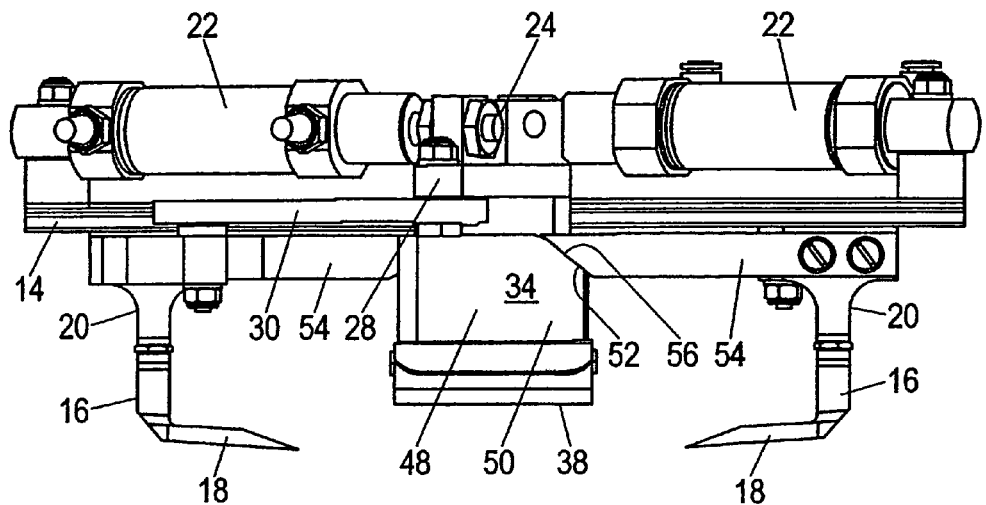
Figure 8:
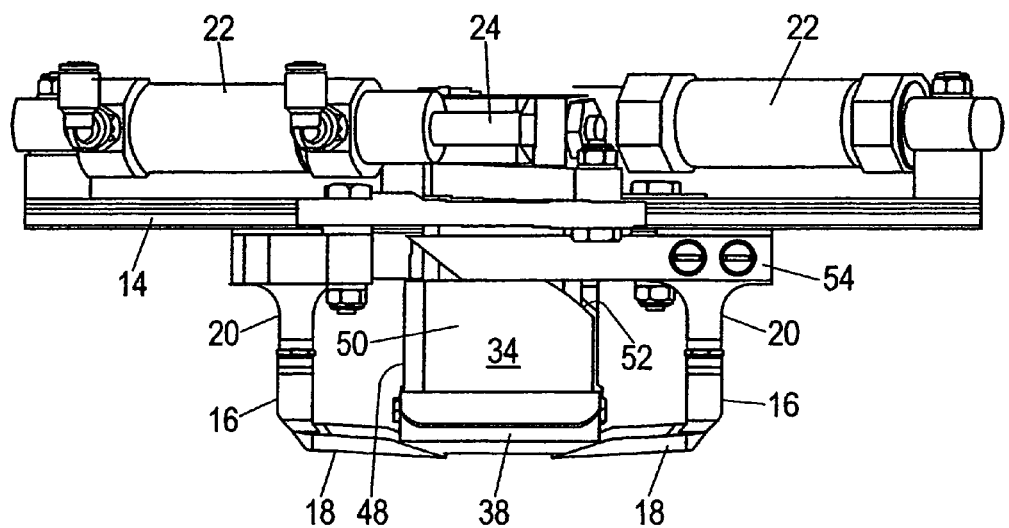
Figure 9:
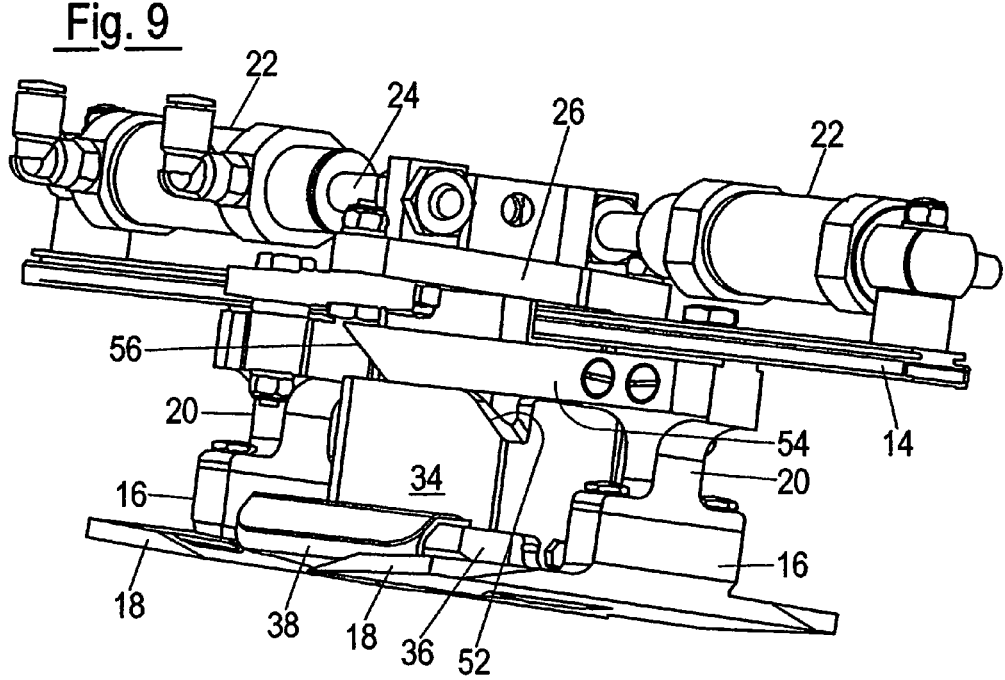
Figure 10:
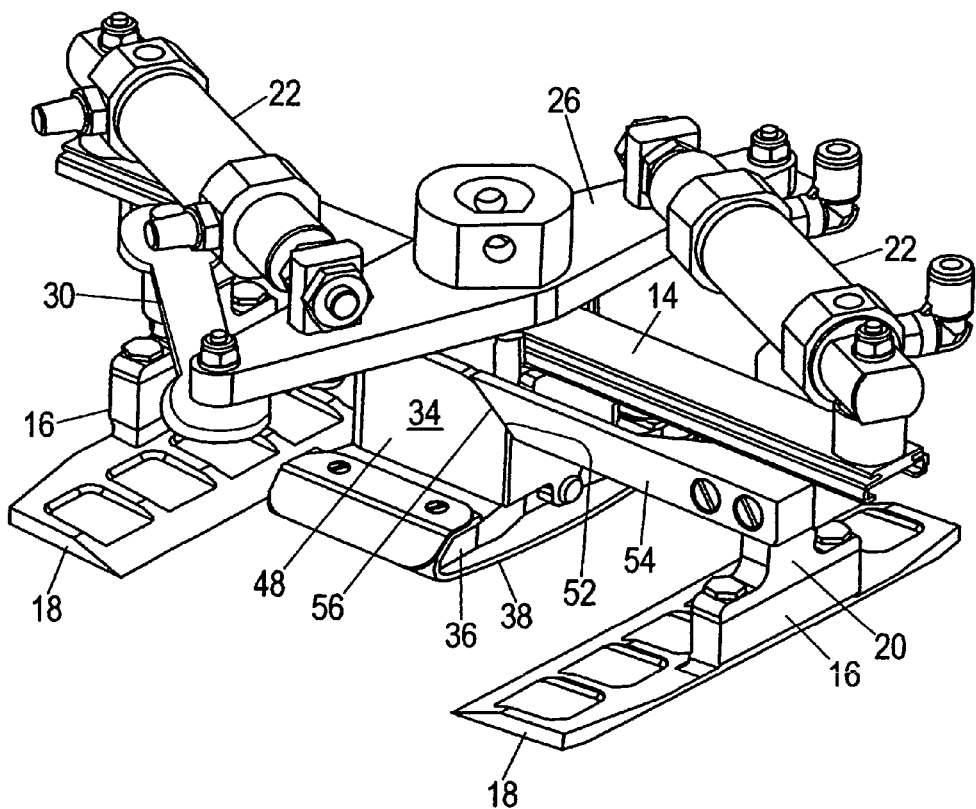
Figure 11:
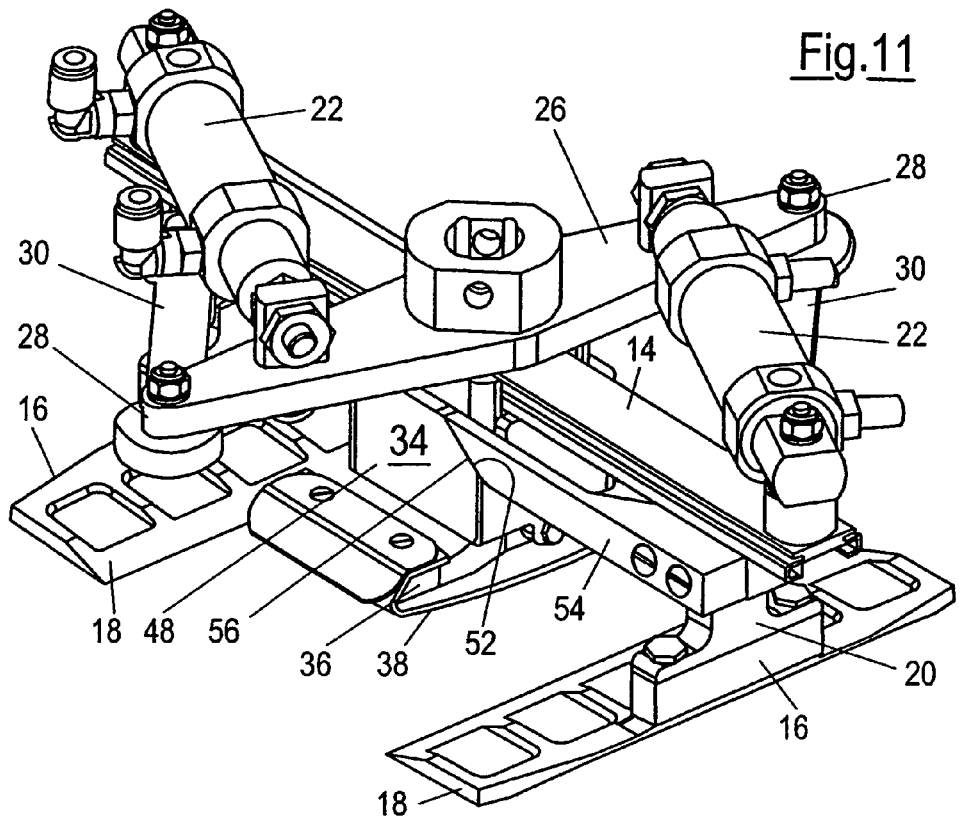
Figure 12:
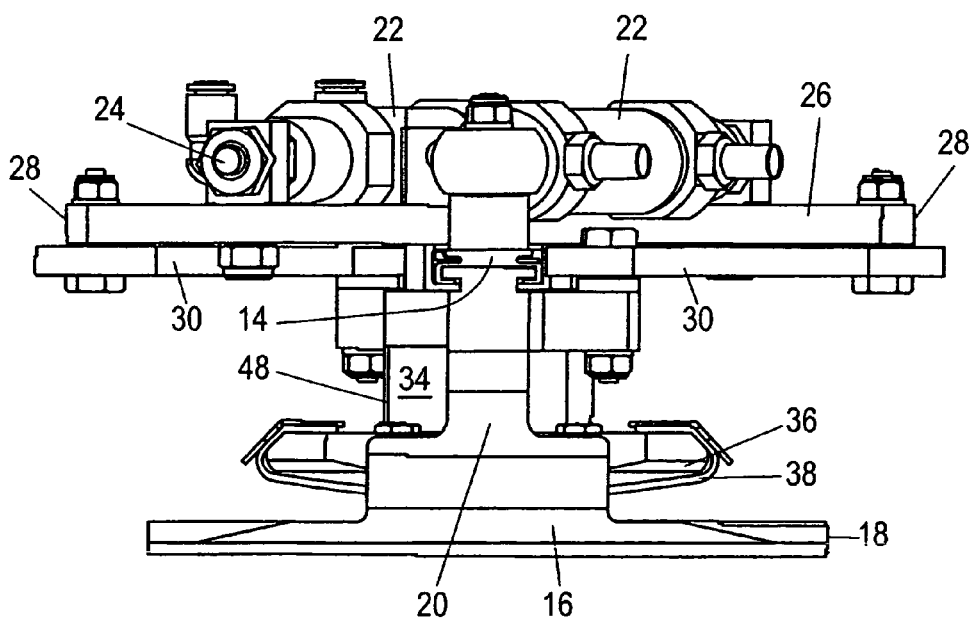

The invention will be described in the following with reference to advantageous embodiments purely by way of example and with reference to the enclosed drawings. There are shown:

FIG. 1 a side view of a product gripper in accordance with the invention in accordance with a first embodiment before the taking up of a product;

FIG. 2 a side view of the product gripper of FIG. 1 after the taking up of the product;

FIGS. 3 to 5 perspective views of the product gripper of FIG. 1 before the taking up of the product;

FIG. 6 a further side view of the product gripper of FIG. 1 before the taking up of the product;

FIG. 7 a side view of a product gripper in accordance with the invention in accordance with a second embodiment before the taking up of a product;

FIG. 8 a side view of the product gripper of FIG. 7 after the taking up of a product;

FIG. 9 a perspective view of the product gripper of FIG. 7 after the taking up of a product;

FIGS. 10 and 11 perspective views of the product gripper of FIG. 7 before the taking up of a product; and FIG. 12 a further side view of the product gripper of FIG. 7 before the taking up of a product.

FIGS. 1 to 6 show a first embodiment of a product gripper which is provided, for example, as part of a robot, not shown, to take up a product 12, e.g. a food product, lying on a product support 10, e.g. an in-belt, and to put it down at a different location.

The product gripper includes a frame structure 14 to whose lower side two vanes 16 are attached which can be moved from a first position, in which the vanes 16 have such a large spacing from one another that they can be placed onto the product support 10 next to the product 12 (FIG. 1), into a second position, in which the vanes 16 have such a small spacing from one another that they at least partly engage beneath the product 12 (FIG. 2).

Each vane 16 includes a vane blade 18 which is attached, e.g. screwed, to a vane blade carrier 20. The vane blade carriers 20 are displaceably supported at the frame structure 14. The vane blade carriers 20 are formed as rigid so that the vane blades 18 always have a fixedly preset spacing from the frame structure 14. The vane blades 18 lie in a plane which will be called a vane blade plane in the following.

A drive mechanism which includes two pneumatically or hydraulically actuable cylinders 22 in which respective pistons 24 are displaceably supported, is provided for the movement of the vanes 16 from the first position into the second position and vice versa. The pistons 24 are connected to a lever arm 26 which is rotatably supported at the frame structure 14 centrally about an axis of rotation perpendicular to the vane blade plane. The lever arm 26 is connected at its one end 28 via a pivotable connection arm 30 to the one vane 16. At its other end 28, the lever arm 26 is connected via a corresponding connection arm 30 to the other vane 16.

If the pistons 24 have moved into their respective cylinders 22, the vanes 16 are in their first position (FIGS. 1 and 3 to 6). If the cylinders 22 are pressurized, the pistons 24 moving out of the cylinders 22 effect a rotation of the lever arm 26 (counter clockwise in FIGS. 3 and 5, indicated by the arrow 32) by which the vanes 16 are moved into their second position and the product gripper is closed (FIG. 2). The opening of the product gripper, i.e. the movement of the vanes 16 from their second position into their first position, takes place in the opposite manner in that the pistons 24 are again moved into their respective cylinders 22.

A downholder 34 is attached centrally between the vanes 16 to the lower side of the frame structure 14 which serves to fix the product 12 to be taken up and to prevent a slipping of the product 12 while the vane blades 18 are slid beneath the product 12.

At its lower side, the downholder 34 has a rectangular plastic plate 36 which is oriented parallel to the vane blade plane and to whose narrow sides the ends of a belt band 38 are fastened. The belt band 38 extends along the lower side of the plastic plate 36 and is installed so loosely that it sags somewhat in the unloaded state of the product gripper and can adapt to the upper side contour of the taken up product in the loaded state of the product gripper. It is self-explanatory that the adaptability of the belt band 38 is the better, the softer the material is.

The plastic plate 36 is installed at the lower end face side of a ramp ring 40 of the downholder 34 facing the blade vane plane, said downholder being arranged concentrically to the axis of rotation of the lever arm 26. At the upper end face side of the ramp ring 40 remote from the vane blade plane and facing the lever arm 26, two ramps 42 are formed which are mutually offset by 180° with respect to the axis of rotation of the lever arm 26; in other words are therefore arranged at oppositely disposed sides of the axis of rotation.

The ramps 42 of the ramp ring 40 cooperate with cams 44 which are formed at the lower side of the lever arm 26. Each cam 44 has a sloped surface 46 at its side running into the corresponding ramp 42.

On the closing of the product gripper for the taking up of a product 12, the vanes 16 are moved together with a rotation of the lever arm 26. In this respect, the rotation of the lever arm 26 does not only effect a movement of the vanes 16, but also simultaneously has the effect that the cams 44 formed at the lever arm 26 run onto their respective ramp 42 of the ramp ring 40. The downholder 34 is hereby moved in the direction of the vane blade plane; in other words, is therefore lowered onto the product 12 to be taken up.

The lowering of the downholder 34 in this respect takes place against the restoring force of a tension spring (not shown) connected between the downholder 34 and the frame structure 14. The tension spring is in other words tensioned during the closing of the product gripper and the lowering of the downholder 34. The restoring force of the tension spring ensures that the downholder 34 moves away from the vane blade plane again, i.e. that is moves upwardly, when the lever arm 26 rotates in the opposite direction for the opening of the product gripper.

The heights of the ramps 42 of the ramp ring and of the cams 44 of the lever arm 26 are selected so that the stroke of the downholder 34 resulting from the running of the cams 44 onto the ramps 42 is sufficient to lower or press the downholder 34 so far that it comes into engagement with the upper side of a product 12 to be taken up and exerts a specific fixing force onto the product.

Furthermore, the particular gradients of the ramps 42 and/or of the sloped surfaces 46 of the cams 44 are selected so that the downholder 34 already fixes a product 12 to be taken up when the vane blades 18 come into engagement with the product 12 and start to move beneath it. Conversely, this means that, on the opening of the product gripper, first the vane blades 18 and the product 12 move out of engagement and then the downholder 34 releases the product 12.

Generally, however, other particular gradients of the ramps 42 or of the sloped surfaces 46 of the cams 44 are also conceivable, for example such that the downholder 34 only moves into engagement with the product 12 when the vane blades 18 have already slid beneath it. This conversely means that, on the opening of the gripper, first the downholder 34 releases the product 12 and then the vane blades 18 and the product 12 move out of engagement.

A second embodiment of a product gripper is shown in FIGS. 7 to 12 which is largely similar to the first embodiment described above. Features of the same construction or function are therefore designated by the same reference numerals.

The second embodiment shown in FIGS. 7 to 12 ultimately only differs from the first embodiment shown in FIGS. 1 to 6 in the ramp mechanism which serves to move the downholder 34 in the direction of the vane blade on the moving together of the vanes 16 in the direction of the vane blade plane and thereby to bring it into engagement with a product 12 to be taken up.

While the ramp mechanism of the product gripper in accordance with the first embodiment converts, as described above, a rotary movement, namely the rotation of the lever arm 26, into a linear movement of the downholder 34, the ramp mechanism of the product gripper in accordance with the second embodiment is designed so that it converts a first linear movement into a second linear movement, namely the movement of the downholder 34.

The downholder 34 of the product gripper in accordance with the second embodiment for this purpose includes a substantially cube-shaped or parallelepiped base body 48 to whose lower side facing the vane blade plane the plastic plate 36 with the belt band 38 is installed.

Two oppositely disposed walls 50 of the base body 48 are oriented substantially at right angles to the vane blade plane and parallel to the direction of movement of the vanes 16. Each of the walls 50 has a sloped surface 52 which faces one of the vanes 16 in an upper corner region remote from the vane blade plane.

A ramp element 54 is fixedly attached, e.g. screwed, to each vane 16, more precisely to each vane blade carrier 20 and extends substantially parallel to the direction of movement of the vanes 16. Each ramp element 54 has a sloped surface 56 at its end remote from the vane which cooperates with one of the sloped surfaces 52 of the base body 48 such that the ramp elements 54 connected to the vanes 16 run onto the base body 48 on the moving together of the vanes 16, whereby the downholder 34 is moved in the direction of the vane blade plane.

It also applies in this embodiment that the particular gradients of the sloped surfaces 52 of the downholder 34 and of the sloped surfaces 56 of the ramp elements 54 coupled with the vanes 16 are selected such that the downholder 34 is already pressed down and exerts a fixing force onto a product 12 to be taken up before the vane blade 18 come into engagement with the product 12. In a similar manner as in the first embodiment, the sloped surfaces 52, 56 in the second embodiment can generally likewise have a different particular gradient.

The sloped surfaces 52 of the base body 48 and the sloped surfaces 56 of the ramp elements 54 are furthermore preferably dimensioned so that they move out of engagement when the downholder 34 is lowered to the maximum so that the ramp elements 54 can slide over the base body 48 to block the downholder 34 in its pressed down position.

In a similar manner as with the product gripper in accordance with the first embodiment, a tension spring is also connected between the lever arm 26 and the downholder 34 in the product gripper in accordance with the second embodiment and is tensioned on the lowering of the downholder and whose restoring force ensures that the downholder again moves upwardly and releases a taken up product when the vanes 16 move apart for the opening of the product gripper.

Furthermore, in a similar manner as in the first embodiment, the ramp elements 54 and the base body 48 in the second embodiment can also cooperate via a cam guide, whereby it would be possible to dispense with a spring element connected between the lever arm 26 and the downholder 34.

REFERENCE NUMERAL LIST 10 product support
12 product
14 frame structure
16 vane
18 vane blade
20 vane blade carrier
22 cylinder
24 piston
26 lever arm
28 end
30 connection arm
32 arrow
34 downholder
36 plastic plate
38 belt band
40 ramp ring
42 ramp
44 cam
46 sloped surface
48 base body
50 wall
52 sloped surface
54 ramp element
56 sloped surface

The invention claimed is:

1. A product gripper for the taking up of a product, comprising:
   two vane blades;
   a drive means to move the vane blades between a first position, in which the vane blades can be placed onto a support for the product to be taken up at oppositely disposed sides of the product to be taken up, and a second position, in which the vane blades are located at least partly beneath the product to be taken up; and a downholder for the fixing of the product to be taken up while the vane blades are moved beneath it, with the downholder being arranged above a vane blade plane defined by the vane blades, characterized by a ramp mechanism, by which the movement of the vane blades relative to one another is coupled to a movement of the downholder relative to the vane blade plane.

2. The product gripper of claim 1, wherein the ramp mechanism is configured so that the downholder comes into engagement with the product to be taken up before the vane blades move beneath it.

3. The product gripper of claim 1, wherein the ramp mechanism is configured to convert a rotation or a translation of the vane blades into a translation of the downholder.

4. The product gripper of claim 1, wherein the ramp mechanism comprises a first part and a second part configured to rotate relative to one another about an axis of rotation.

5. The product gripper of claim 4, wherein the first part of the ramp mechanism comprises a ramp ring of the downholder.

6. The product gripper of claim 5, wherein the ramp ring of the downholder is concentric to the axis of rotation.

7. The product gripper of claim 4, wherein the axis of rotation is perpendicular to the vane blade plane.

8. The product gripper of claim 4, wherein the second part of the ramp mechanism is connected to a lever arm which is pivotable.

9. The product gripper of claim 8, wherein the lever arm is pivotable about the axis of rotation.

10. The product gripper of claim 8, wherein the second part of the ramp mechanism comprises at least one cam facing the vane blade plane.

11. The product gripper of claim 10, wherein the cam has a sloped surface at a side adjacent a first part of the ramp mechanism.

12. The product gripper of claim 1, wherein the ramp mechanism comprises a first and a second part which are displaced in a linear manner relative to one another and are in engagement with one another via sloped surfaces thereof.

13. The product gripper of claim 12, wherein the first part of the ramp mechanism includes at least one sloped surface of the downholder.

14. The product gripper of claim 12, wherein the second part of the ramp mechanism is fixedly connected to one of the vane blades.

15. The product gripper of claim 14, wherein the second part of the ramp mechanism comprises a ramp element extending substantially in parallel or obliquely to the vane blade plane and having a sloped surface at an end of the ramp element that is remote from the one of the vane blades.

16. The product gripper of claim 15, wherein a dimension of the sloped surface of the ramp element viewed parallel to the vane blade plane is shorter than a distance between the first and second positions of the vane blades.

17. The product gripper in accordance with of claim 14, wherein the second part of the ramp mechanism is fixedly connected to each of the vane blades.

18. The product gripper of claim 1, wherein the downholder is rotationally fixedly attached to a frame structure of the product gripper.

19. The product gripper of claim 1, wherein the downholder is movable toward the blade vane plane against the restoring force of a spring element.

20. A product gripper for the taking up of a product, comprising two vane blades;

a driver configured to move the vane blades between a first position, in which the vane blades can be placed onto a support for the product at opposite sides of the product, and a second position, in which the vane blades are located at least partly beneath the product;

a downholder configured to secure the product while the vane blades are moved beneath the product, wherein the downholder is disposed above a vane blade plane defined by the vane blades; and a ramp mechanism, configured to transfer movement of the vane blades relative to one another to the downholder, such that the downholder moves relative to the vane blade plane.

* * * * *